(12) United States Patent
Shepard et al.

(10) Patent No.: US 6,620,472 B1
(45) Date of Patent: *Sep. 16, 2003

(54) LAMINATED RESILIENT FLEXIBLE BARRIER MEMBRANES

(75) Inventors: Erwin C. Shepard, West Bloomfield, MI (US); DeWayne R. Hartlerood, Chesterfield, MO (US); Paul H. Mitchell, Chesterfield, MO (US)

(73) Assignees: Nike, Inc., Beaverton, OR (US); Tetra Plastics, St. Charles, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/684,351

(22) Filed: Jul. 19, 1996

Related U.S. Application Data

(63) Continuation of application No. 08/299,286, filed on Aug. 31, 1994, now abandoned.

(51) Int. Cl.[7] .................. B29D 22/00; B32B 27/40; A43B 13/40
(52) U.S. Cl. .................. 428/35.4; 95/43; 96/4; 96/11; 210/490; 210/500.27; 210/500.36; 210/500.42; 428/36.6; 428/36.7; 428/36.8; 428/332; 428/424.2; 428/424.4; 428/424.8; 473/603; 473/604; 473/609
(58) Field of Search .................. 95/43; 96/4, 11; 138/26, 28, 30; 210/500.42, 500.36, 500.27, 490; 428/423.1, 424.2, 424.4, 424.8, 500, 332, 35.4, 36.6, 36.7, 36.8; 473/603, 604, 609, FOR 145, FOR 165, FOR 152

(56) References Cited

U.S. PATENT DOCUMENTS

| | | | |
|---|---|---|---|
| 3,718,494 A | 2/1973 | Jacobson | 106/415 |
| 4,082,854 A | 4/1978 | Yamada et al. | 426/106 |
| 4,219,945 A | 9/1980 | Rudy | 36/29 |

(List continued on next page.)

FOREIGN PATENT DOCUMENTS

| | | |
|---|---|---|
| CA | 2123053 | 5/1994 |
| EP | 0624463 | 4/1994 |
| JP | 58-22163 | 2/1983 |
| JP | 59196706 | 11/1984 |
| JP | 59116145 | 5/1987 |

OTHER PUBLICATIONS

English Translation of French Patent No. 2,636,638, published Mar. 23, 1990.
Bayer Sales Brochure, *Engineering Polymers Properties Guide*, (May 1995), three (3) pages.
Mark, Herman F. et al. eds., *Encyclopedia of Polymer Science and Engineering*, 2d. ed. (1985–1987), pp. 615–617 and 509.
Parker, Sybil P., ed., *McGraw–Hill Dictionary of Scientific and Technical Terms*, 5th ed. (1994), two (2) pages.
Lewis, Sr., Richard J., ed., *Hawley's Condensed Chemical Dictionary*, 12th ed. (1993), pps. 291, 737.

*Primary Examiner*—D. S. Nakarani
(74) *Attorney, Agent, or Firm*—Harness, Dickey & Pierce, P.L.C.

(57) ABSTRACT

The present invention relates to laminated membranes formed by multi-layer processing techniques including alternating layers of thermoplastic urethane and a copolymer of ethylene and vinyl alcohol. The membranes are characterized in that hydrogen bonds are formed between the layers of thermoplastic urethane and the copolymer of ethylene and vinyl alcohol. The membranes are characterized in that hydrogen bonds are formed between the layers of thermoplastic urethane and the copolymer of ethylene and vinyl alcohol.

30 Claims, 6 Drawing Sheets

U.S. PATENT DOCUMENTS

| | | | |
|---|---|---|---|
| 4,257,176 A | 3/1981 | Hartung et al. | 36/44 |
| 4,340,626 A | 7/1982 | Rudy | 428/35 |
| 4,344,987 A | 8/1982 | Ostertag et al. | 427/21 |
| 4,423,185 A | 12/1983 | Matsumoto et al. | 525/66 |
| 4,429,076 A | 1/1984 | Saito et al. | 525/57 |
| 4,501,790 A | 2/1985 | Aizawa et al. | 428/283 |
| 4,513,058 A * | 4/1985 | Martin | 428/336 |
| 4,536,425 A | 8/1985 | Hekal | 428/36.4 |
| 4,551,518 A | 11/1985 | Matsumoto et al. | 528/80 |
| 4,557,859 A | 12/1985 | Maeda et al. | 252/511 |
| 4,610,099 A | 9/1986 | Signori | 36/3 B |
| 4,614,208 A | 9/1986 | Skarelius | 138/103 |
| 4,660,831 A * | 4/1987 | Kralik | 273/65 E |
| 4,681,797 A | 7/1987 | Van Iseghem | 428/212 |
| 4,692,361 A | 9/1987 | Johnston et al. | 428/35 |
| 4,722,131 A | 2/1988 | Huang | 29/450 |
| 4,731,289 A | 3/1988 | Coleman | 428/334 |
| 4,786,685 A | 11/1988 | Takida et al. | 525/58 |
| 4,864,738 A | 9/1989 | Horovitz | 36/29 |
| 4,887,367 A | 12/1989 | Mackness et al. | 36/28 |
| 4,890,822 A | 1/1990 | Ezure et al. | 267/64.24 |
| 4,927,689 A | 5/1990 | Markiewicz | 428/34.8 |
| 4,936,029 A | 6/1990 | Rudy | 36/29 |
| 4,960,639 A | 10/1990 | Oda et al. | 428/34.5 |
| 4,978,394 A | 12/1990 | Ostertag et al. | 106/404 |
| 4,999,229 A | 3/1991 | Moritani et al. | 428/36.6 |
| 5,003,002 A | 3/1991 | Ofstein | 525/58 |
| 5,030,404 A | 7/1991 | Bonnebat et al. | 264/185 |
| 5,036,110 A | 7/1991 | Moureaux | 121/137 |
| 5,036,603 A | 8/1991 | Dischler | 36/44 |
| 5,042,176 A | 8/1991 | Rudy | 36/29 |
| 5,053,455 A | 10/1991 | Kroggel et al. | 525/58 |
| 5,059,245 A | 10/1991 | Phillips et al. | 106/22 |
| 5,090,010 A | 2/1992 | Takahashi | 369/291 |
| 5,096,756 A | 3/1992 | Walters | 428/35.5 |
| 5,157,082 A | 10/1992 | Johnson | 525/237 |
| 5,198,042 A | 3/1993 | Masumoto et al. | 148/403 |
| 5,215,124 A | 6/1993 | Hattori et al. | 138/30 |
| 5,246,761 A | 9/1993 | Sasaki | 428/156 |
| 5,292,824 A | 3/1994 | Nagai et al. | 525/399 |
| 5,294,112 A * | 3/1994 | Smith | 273/58 BA |
| 5,300,334 A | 4/1994 | Niederst et al. | 428/35.7 |
| 5,332,767 A | 7/1994 | Reisser et al. | 523/209 |
| 5,346,950 A | 9/1994 | Negi et al. | 525/57 |
| 5,393,832 A | 2/1995 | Moulies et al. | 525/57 |
| 5,409,041 A | 4/1995 | Yoshida et al. | 138/30 |
| 5,416,988 A | 5/1995 | Potter et al. | 36/89 |
| 5,429,852 A | 7/1995 | Quinn | 428/71 |
| 5,436,295 A | 7/1995 | Nishikawa et al. | 525/42 C |
| 5,456,787 A | 10/1995 | Myles | 156/321 |
| 5,458,935 A | 10/1995 | Alzner | 428/35.7 |
| 5,462,980 A | 10/1995 | Bastioli et al. | 524/47 |
| 5,489,455 A | 2/1996 | Nugent, Jr. et al. | 428/36.91 |
| 5,498,662 A | 3/1996 | Tanaka et al. | 525/54.2 |
| 5,532,284 A | 7/1996 | Bartlett et al. | 521/134 |
| 5,540,770 A | 7/1996 | Schmid et al. | 106/403 |
| 5,567,489 A | 10/1996 | Allen et al. | 428/34.1 |
| 5,578,372 A | 11/1996 | Murakami | 428/336 |
| 5,591,798 A | 1/1997 | Patel | 524/514 |
| 5,601,889 A | 2/1997 | Chundury et al. | 428/34.3 |
| 5,609,962 A | 3/1997 | Ouhadi | 428/480 |
| 5,612,101 A | 3/1997 | Furuta et al. | 428/1 |
| 5,633,065 A | 5/1997 | Matsukura et al. | 428/112 |
| 5,645,923 A | 7/1997 | Matsuo et al. | 428/216 |
| 5,662,738 A | 9/1997 | Schmid et al. | 106/404 |
| 5,693,424 A | 12/1997 | Watanabe et al. | 428/474.7 |
| 5,700,560 A | 12/1997 | Kotani et al. | 428/325 |
| 5,952,065 A * | 9/1999 | Mitchell et al. | 428/35.4 |

* cited by examiner

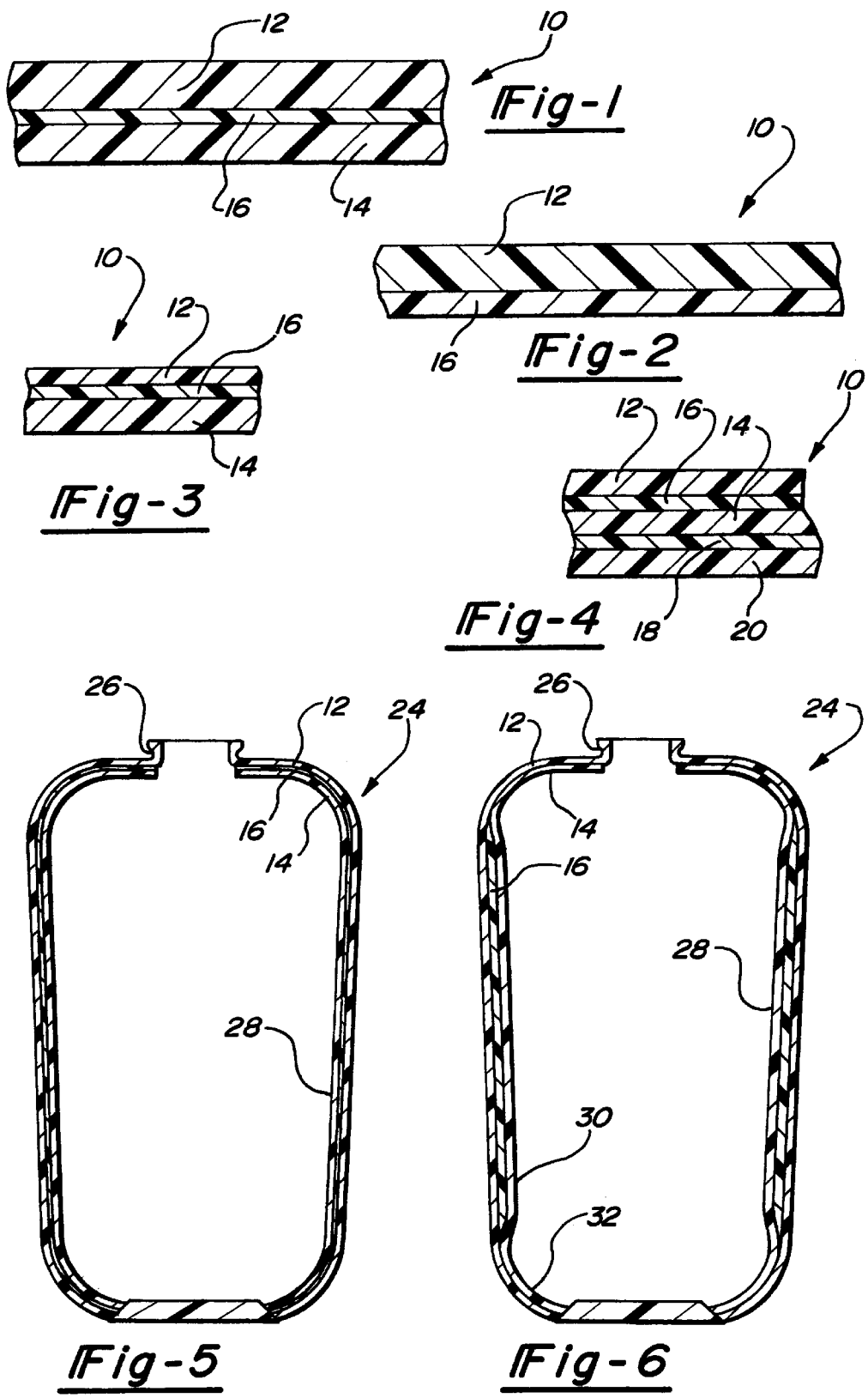

LAMINATED RESILIENT FLEXIBLE BARRIER MEMBRANES

This is a continuation of U.S. patent application Ser. No. 08/299,286, filed Aug. 31, 1994, now abandoned.

FIELD OF THE INVENTION

The present invention relates to laminated flexibly resilient barrier membranes, and more particularly, to a laminated and flexibly resilient membrane having a multi-layered construction which is useful as a barrier between two different media.

For a further understanding of the present invention, reference can be made to U.S. Patent Application Ser. No. 08/299,287 entitled "Cushioning Device with Improved Flexible Barrier Membrane" which was filed concurrently herewith on Aug. 31, 1994, now U.S. Pat. No. 5,952,065 and is hereby expressly incorporated by reference.

BACKGROUND OF THE INVENTION

It is known in the prior art that certain barrier membranes which are useful under relatively harsh environmental conditions, e.g., membranes used for pressure accumulators, should exhibit both flexibility and imperviousness. This allows effective transmission of pressures between compartments containing a liquid and compartments containing a gas, respectively, in such accumulators. Unfortunately, there is no single material known which exhibits an acceptable level for both of these properties.

Materials which exhibit acceptable flexibility (such as thermoplastic materials of the polyurethane family) tend to have an unacceptably low level of resistance to gas permeation which results in a loss of the entrapped gas through the material. In contrast, materials which exhibit an acceptable level of resistance to gas permeation tend to have an unacceptably low level of flexibility. Thus, they are not useful in an environment which requires constant flexure.

In an attempt to address the problem of supplying a product which has the characteristics of both flexibility and imperviousness, U.S. Pat. No. 5,036,110 discloses an resilient membrane and a hydro-pneumatic accumulator fitted with that membrane. The first material which provides for the required elasticity is selected from among the thermoplastic polyurethanes, block amide polyethers, flexible polyesters and mixtures of such materials. The second material is grafted onto or embedded into the body of the first material in an effort to provide the required resistance to gas permeation. This second material is noted as being selected from the group consisting of copolymers of ethylene and vinyl alcohol, polyamides, polyvinylidene chlorides and mixtures of such materials. One additional embodiment discloses a film of the second material arranged in a sandwich-like fashion between two layers of the first material. All of the embodiments in U.S. Pat. No. 5,036,110 are manufactured using a bi-material injection press said to be commonly used in the industry of thermoplastics material formation. The perceived problems associated with the bi-material injection molding of the membrane as disclosed in U.S. Pat. No. 5,036,110 include the inability to accurately position and control thicknesses of the various layers within the molded membrane and the inability of the bi-material injection molding process to adequately bond the various materials together to form a unitary wall for the membrane without either creating a graft copolymer, modifying the second material with additional co-monomers, or employing an adhesive or tie-layer.

SUMMARY OF THE INVENTION

The primary object of the present invention is to provide a multi-layered membrane which has (1) a desirable level of flexibility (or rigidity); (2) a desirable level of resistance to degradation caused by moisture and (3) an acceptable level of imperviousness to fluids which can be in the form of gases, liquids or both depending mainly on the intended use of the product, while overcoming the problems associated with the prior art. The flexibility and resistance to degradation caused by moisture are generally obtained by using a thermoplastic polyurethane while the imperviousness to media such as liquids and/or gases is generally obtained by using an intermediate layer or a layer generally not exposed to the atmosphere of barrier material such as a copolymer of ethylene and vinyl alcohol, for example.

This object is achieved by using a multi-layer process such as co-extrusion blow molding, or coextrusion of sheet, film, tubing, or profile, for example, which incorporates a separate material flow channel for each material. Typically, first and second extrusion channels for the flexible material (i.e. the thermoplastic polyurethane) are located on either side of the extrusion channel for the barrier material (i.e. the copolymer of ethylene and vinyl alcohol).

The membrane manufactured according to this invention results from laminating the thermoplastic polyurethane and the main barrier material by bringing the selected materials into reactive contact at a temperature of approximately 300° F. to 450° F. The lamination within the scope of the present invention can be carried out under a variety of plastic forming techniques to create a bond between the two differing materials over substantially the entire intended contact surface of the two differing materials according to the following reaction, when a copolymer of ethylene and vinyl alcohol is employed at least in part as the barrier material:

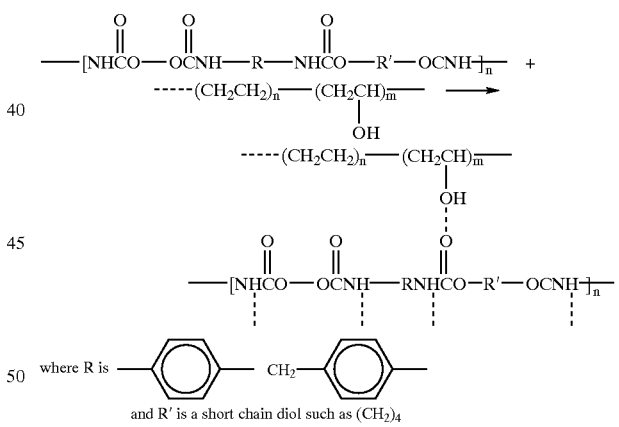

According to a first exemplary embodiment of the present invention, the membrane consists of an inner layer of the main barrier material having an average thickness between approximately 10 microns to about 500 microns bonded between a first outer layer and a second outer layer, both outer layers being formed from a material including or consisting essentially of a prepolymeric thermoplastic polyurethane film. The first and second layers of laminate typically have a thickness of at least 0.01 millimeters (mm) for applications such as hydraulic accumulators. It is contemplated that material thicknesses less than 0.01 mm can be employed for other applications such as films used in the food packaging industry. The laminating process of the present invention controls the relative position of the laminates, as well as (in theory) providing for the surface bonding between the laminates. Accordingly, adhesives (or tie-layers as they are often called in the thermoplastic forming industry) are not required or desirable.

According to a second exemplary embodiment of the present invention, the membrane consists of an inner layer comprising a main barrier material having a thickness between approximately 10 microns to about 500 microns which is surface bonded in accordance with the above listed reaction on one side to at least one outer layer of the thermoplastic polyurethane. Again, the reactive contact in the lamination process of the present invention provides for strong surface bonding between the layers thereby eliminating the need for adhesive tie-layers. According to still other exemplary embodiments, membranes consisting of multiple layers (i.e. at least five) including alternating layers of thermoplastic urethanes and main barrier materials are disclosed.

Still other advantages and objects of the present invention will become apparent to those skilled in the art from the subsequent detailed description, appended claims and drawings.

The present invention also relates to the processes and methods for preparing the laminated resilient barrier membranes of the present invention, as well as the membranes so made.

BRIEF DESCRIPTION OF THE DRAWINGS

FIG. 1 is a cross-sectional view of a first exemplary laminated membrane embodiment according to the present invention;

FIG. 2 is a cross-sectional view of a second exemplary laminated membrane embodiment according to the present invention;

FIG. 3 is a cross-sectional view of a third exemplary laminated membrane embodiment according to the present invention.

FIG. 4 is a cross-sectional view of a fourth exemplary laminated membrane embodiment according to the present invention;

FIG. 5 is a cross-sectional view of a product formed from a laminated membrane according to the present invention;

FIG. 6 is a cross-sectional view of a second product manufactured using a laminated membrane according to the present invention;

DESCRIPTION OF THE PREFERRED EMBODIMENT

Figure 7:
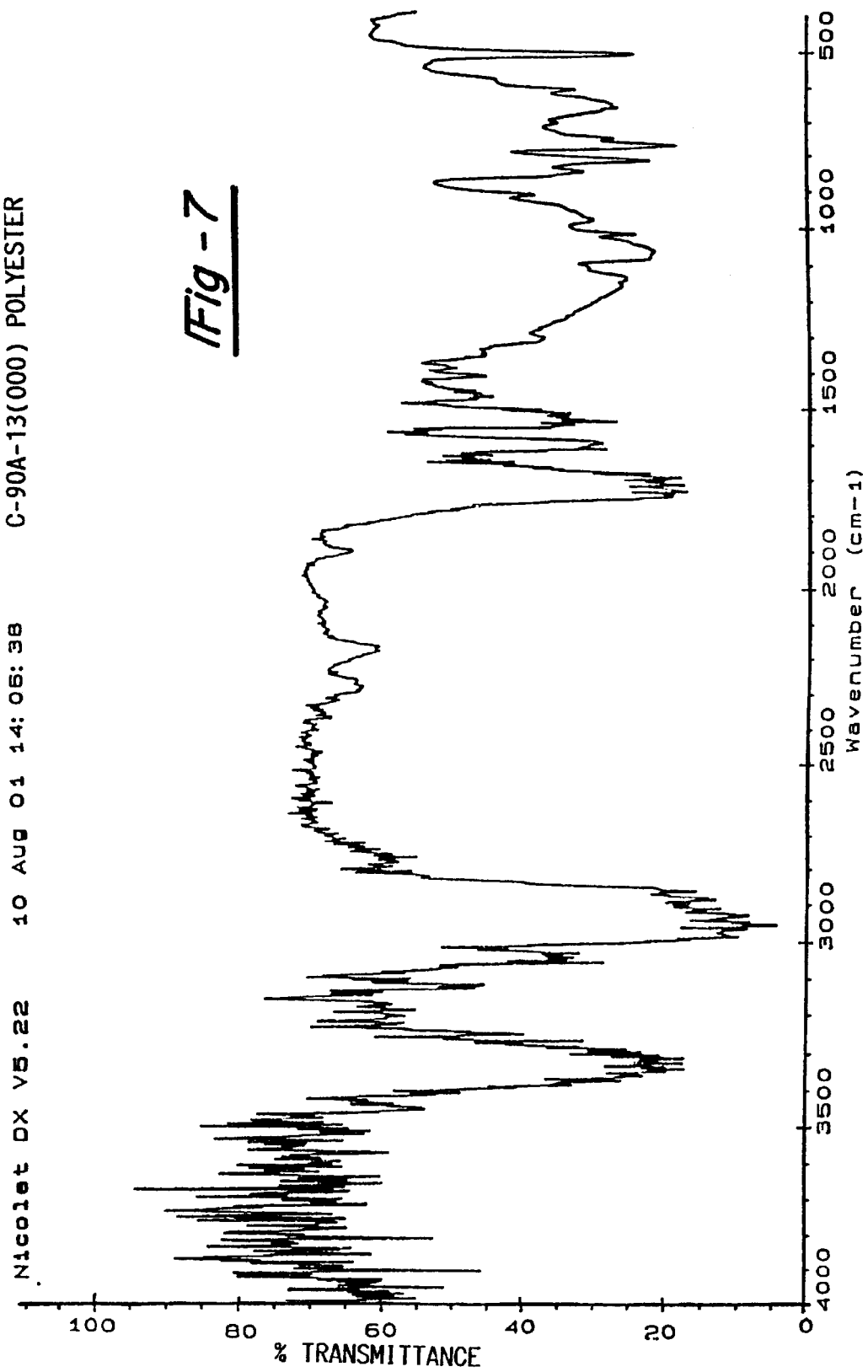
FIG. 7 is a schematic view of a Fourier Transform Infrared Radiation (FTIR) spectrum of a first sample material.
Figure 8:
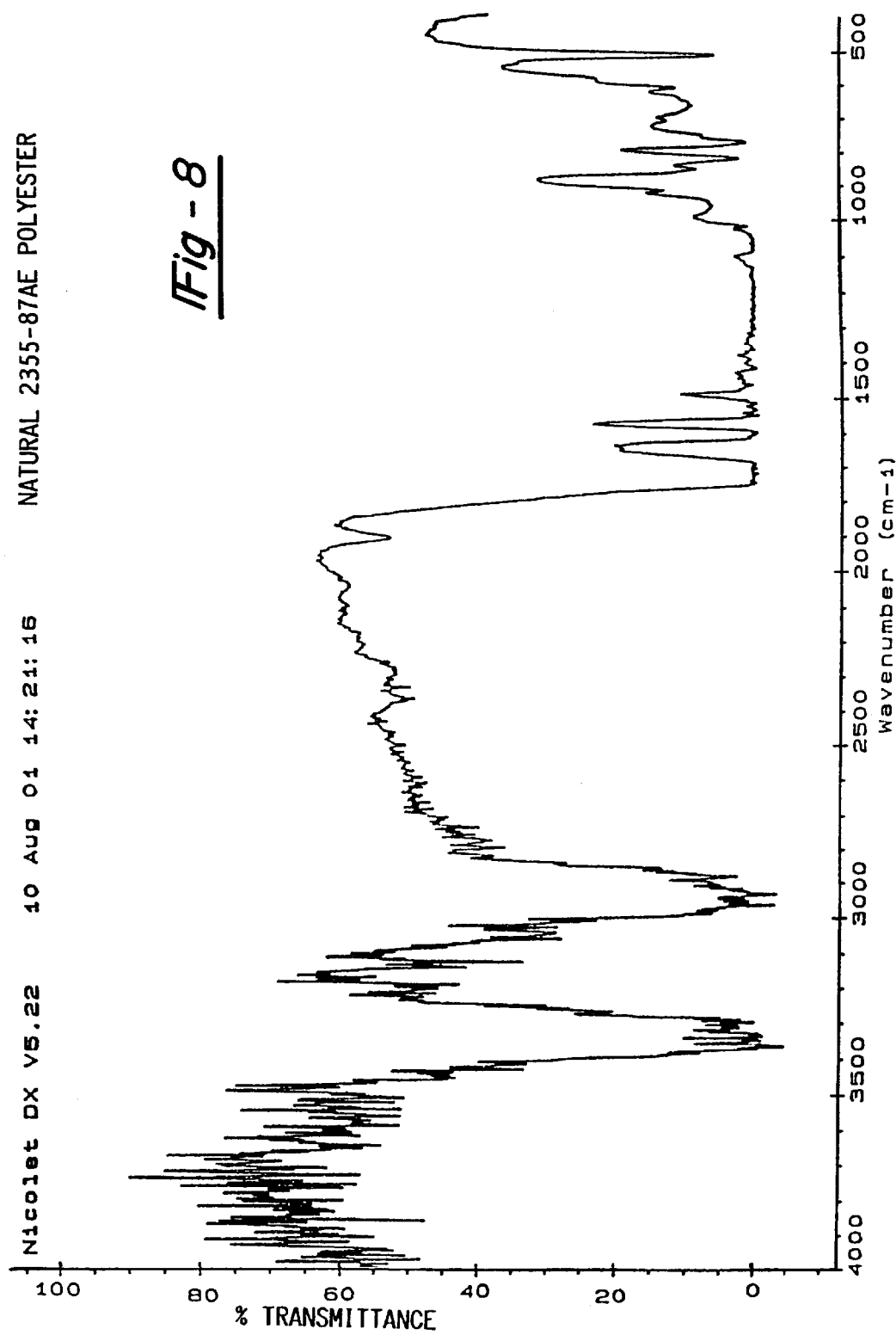
FIG. 8 is a schematic view of a Fourier Transform Infrared Radiation (FTIR) spectrum of a second sample material.
Figure 9:
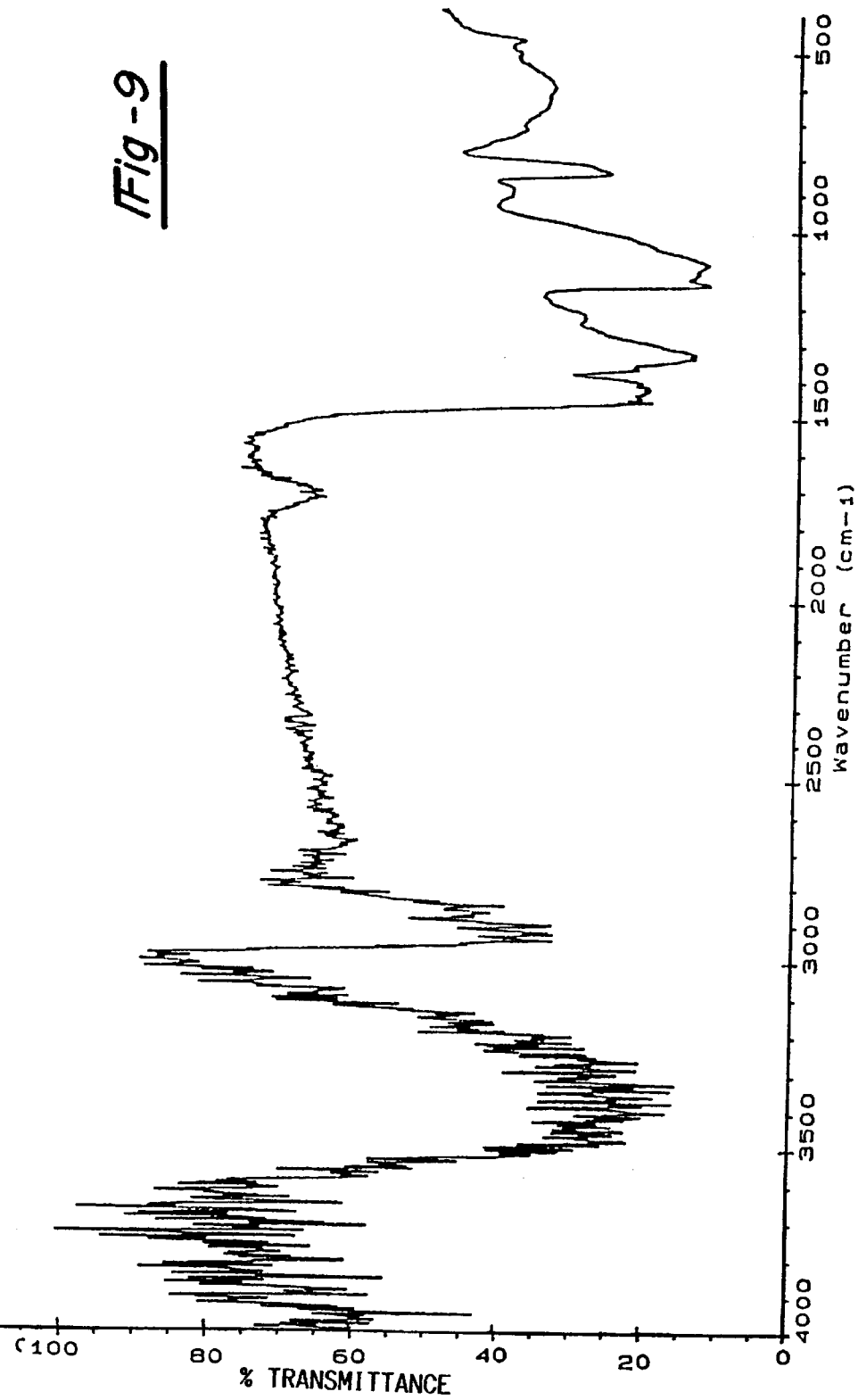
FIG. 9 is a schematic view of a Fourier Transform Infrared Radiation (FTIR) spectrum of a third sample material.
Figure 10:
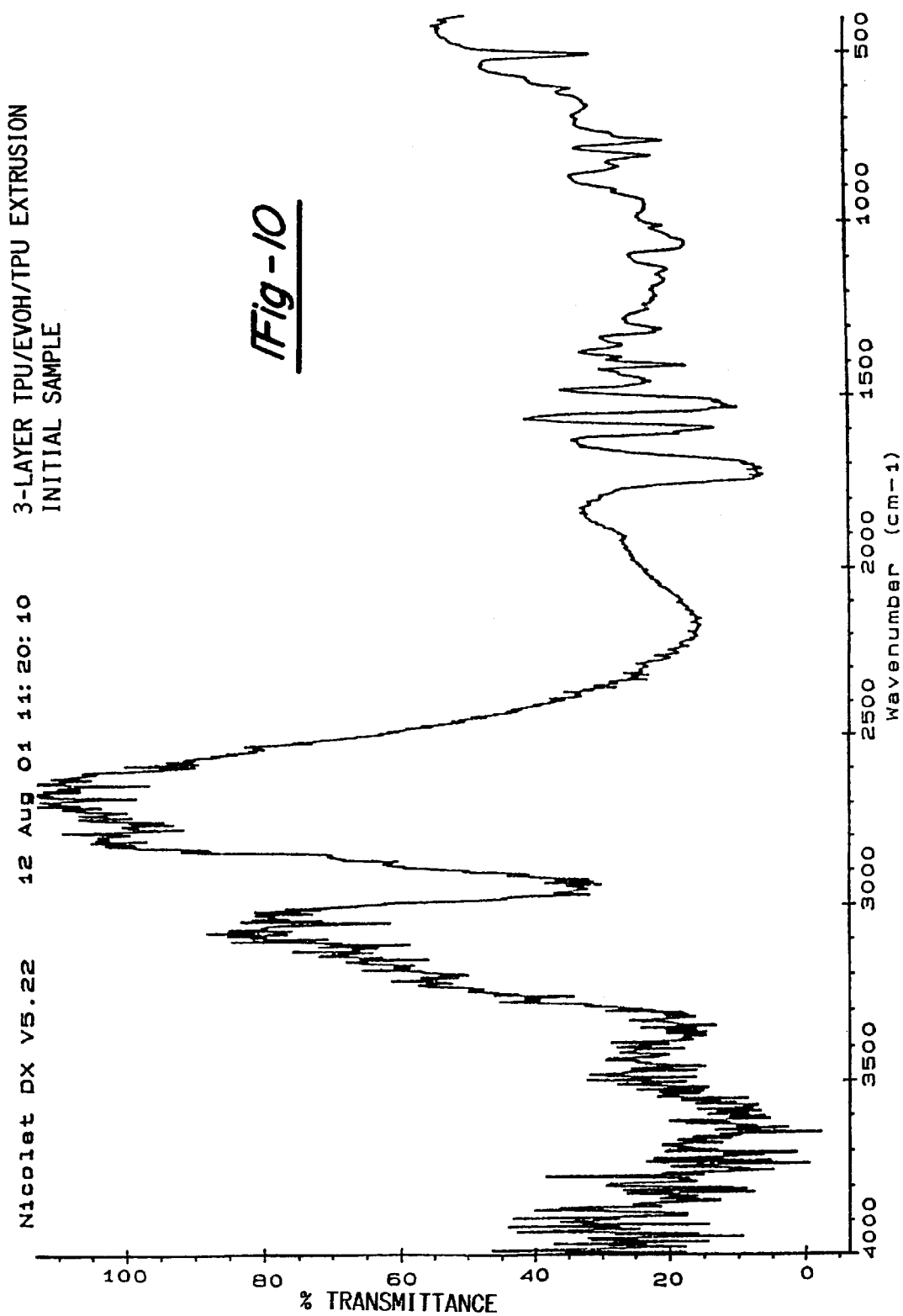
FIG. 10 is a schematic view of a Fourier Transform Infrared Radiation (FTIR) spectrum of a fourth sample material.

Referring now to the drawings in which like reference numerals designate like or corresponding parts throughout the several views, there is shown in FIG. 1, a laminated, resilient and flexible membrane manufactured in accordance with the teachings of the present invention which is designated generally by the reference numeral 10. Laminated membrane 10 comprises a first outer layer 12, a second outer layer 14 and an intermediate layer 16. First outer layer 12 and the second outer layer 14 are formed from a material comprising thermoplastic polyurethane (TPU). Depending mainly upon the intended use of the final product formed utilizing the membrane 10, the first and second layers can have an average thickness ranging from below 0.01 millimeters up to the limits dictated by processing. The intermediate layer 16 is formed from a barrier material selected from the group consisting of copolymers of ethylene and vinyl alcohol, aliphatic and aromatic polyamides, polyvinylidene chloride, co-polymers of acrylonitride and methyl acrylate, polyesters, liquid crystal polymers, polyurethane based thermoplastics, and mixtures thereof. In a preferred embodiment, the barrier material employed will include a copolymer of ethylene and vinyl alcohol (EVOH) with an average thickness of between about 10 microns to about 500 microns. In yet a still more preferred embodiment, the barrier material will consist essentially of a copolymer of ethylene and vinyl alcohol, and having an average ethylene content of about 27 mol % to about 48 mol The thermoplastic urethane utilized under the teachings of the present invention are generally commercially available products such as Pellethane™ (which is a trademarked product of the Dow Chemical Co. of Midland, Mich.) and Elastollan® (which is a registered trademark of the BASF Corporation) and Estane® (which is a registered trademark of the B.F. Goodrich Co.) all of which are either ester or ether based urethanes engineered to impart flexible qualities to products produced therewith. In addition to these commercially available thermoplastic urethanes, others including those selected from the group consisting of polyester, polyether, polycaprolactone, polyoxypropylene and polycarbonate macrogel based materials and mixtures thereof, can be employed.

The copolymers of ethylene and vinyl alcohol utilized under the teachings of the present invention are also preferably commercially available products such as EVAL® which is a registered trademark of the Eval Company of Elisle, Ill. and SOARNOLT™ (which is a trademarked product available from the Nippon Gosei co., Ltd. [U.S.A.] of New York, N.Y.) both of which are engineered to have a relatively high resistance to degradation caused by moisture and to provide superior barrier properties for resistance to undesired gas permeation.

It is important to note that a variety of products can be formed which incorporate or employ the membranes 10 disclosed herein including, without limitation, bladders useful for inflatable objects, such as footballs, basketballs, soccer balls and inner tubes; footwear; food packaging films; fuel lines; fuel storage tanks; and pressurized accumulators.

Referring now to FIG. 2, a cross-sectional representation of a second exemplary embodiment of a membrane 10 according to the teachings of the present invention is shown. Under this exemplary embodiment, the membrane 10 includes a first layer 12 made from thermoplastic urethane and a second layer 16 made from a main barrier material selected from the group consisting of copolymers of ethylene and vinyl alcohol, aliphatic and aromatic polyamides, polyvinylidene chloride, co-polymers of acrylonitride and methyl acrylate, polyesters, liquid crystal polymers, polyurethane based thermoplastics, and mixtures thereof. The first layer 12 will typically have an average thickness of at least 0.01 millimeters and the second layer 16 have an average thickness of between about 10 microns to about 500 microns depending on the product produced as a result of laminating the first and second layers 12 and 16, respectively. As will be discussed in greater detail below, as used herein the term "laminated" is intended to mean reactive contact in the form of primarily hydrogen bonding occurs along extended lengths of the product. Thus, not only are the membrane embodiments of the present invention multi-layered, but they also are resistant to delamination which often occurs with products used under harsh environmental conditions and are frequently capable of recovering from such harsh treatment without the use of adhesives or tie-layers, or the additional modification of either layer.

It is important to note that the membrane 10, as illustrated in FIG. 2, can be utilized such that the first layer 12 is positioned as the inside layer and the second layer 16 is disposed on the outside of certain desired products.

Additionally, the first layer 12 can be disposed on the outside of the product with the second layer 16 being disposed on the inside. This arrangement would most likely be employed under situations where moisture may be in contact with the membrane, in view of the fact that the barrier material, and particularly the copolymer of ethylene and vinyl alcohol is susceptible to degradation caused by moisture in the surrounding atmosphere.

Referring to FIG. 3, a third exemplary membrane embodiment in accordance with the teachings of the present invention is shown. Under this embodiment, again a three layer laminate is contemplated comprising first and second layers 12 and 14, respectively, made from thermoplastic urethane and an intermediate layer 16 made from a barrier material selected from the group consisting of a copolymer of ethylene and vinyl alcohol, aliphatic and aromatic polyamides, polyvinylidene chloride, co-polymers of acrylonitride and methyl acrylate, polyesters, liquid crystal polymers, polyurethane based thermoplastics, and mixtures thereof. The membrane 10, as illustrated in FIG. 3, is essentially the same as that demonstrated in FIG. 1 except that the thickness of the three layers differ. For example, the first layer 12, which includes thermoplastic urethane, may have an average thickness below 0.01 millimeters while the second layer 14, which is also comprised of thermoplastic urethane, has an average thickness above 0.01 millimeters. Generally, enhanced thicknesses are desired under situations where the product, and more particularly, the thick layer is exposed to a harsh environment. In contrast, reduced thicknesses, namely those below an average of about 0.01 millimeters would be desirable where the layer of thermoplastic urethane is mainly used as a protective layer for the barrier layer 16. An intermediate barrier layer 16 is still employed therebetween regardless of the respective thicknesses of the first and second layers 12 and 14 thereby providing the benefits of selective resistance to gas permeation.

Finally, with reference to FIG. 4, a fourth exemplary membrane embodiment 10 is illustrated in accordance with the teachings of present invention. Under this embodiment, a five layer laminate, including three layers employing thermoplastic urethanes, (designated as reference numerals 12, 14 and 18) and two layers of a barrier material selected from the group consisting of copolymers of ethylene and vinyl alcohol, aliphatic and aromatic polyamides, polyvinylidene chloride, co-polymers of acrylonitride and methyl acrylate, polyesters, liquid crystal polymers, polyurethane based thermoplastics, and mixtures thereof (designated as reference numerals 16 and 20) is shown. Preferably, the two layers 16 and 18 of the barrier material are interspersed between the layers 12, 14 and 20 of thermoplastic urethane in a sandwich-like fashion.

By way of example, FIG. 5 illustrates a product which can be manufactured using laminated membranes 10 of the three layer variety. The product is in the form of a bladder 24 designed to be used in a hydraulic accumulator which is used for vehicle suspension systems, vehicle brake systems, industrial hydraulic accumulators or for any accumulators having differential pressures between two potentially dissimilar fluid media. The bladder 24 separates the hydraulic accumulator into two chambers or compartments, one of which contains a gas such as nitrogen and the other one of which contains a liquid. Bladder 24 includes an annular collar 26 and a flexible partition 28. Annular collar 26 is adapted to be secured circumferentially to the interior surface of the spherical accumulator such that partition 28 divides the accumulator into two separate chambers. Flexible partition 28 moves generally diametrically within the spherical accumulator and its position at any given time is dependant upon the pressure of the gas on one side in conjunction with the pressure of the liquid on the opposite side.

By way of further example, FIG. 6 illustrates a product manufactured using a combination of three layer membrane segments 30 such as those shown in the membranes 10 of FIGS. 1, 3 and 4 along with intermittent two layer segments 32 of thermoplastic urethane material. It may be desirable to utilize these so-called intermittent constructions under circumstances where the delamination potential along certain segments of a product are relatively high. One such location is along the annular collar 6 of bladder or diaphragm for hydraulic accumulators. Thus, it should be recognized that the membranes 10 described herein can include segments which do not include one or more layers of the ethylene vinyl alcohol copolymer.

Preferably, the thermoplastic polyurethane and ethylene vinyl alcohol are not modified in an effort to create cross-linking or conventional covalent bonding between the two layers; nor are any tie-layers or adhesive employed. The preferred compositions and methods of the present invention rely exclusively on the inherent properties of the thermoplastic urethane and copolymer of ethylene and vinyl alcohol when brought into reactive contact according to the methods of the present invention, e.g., to maximize and rely primarily upon hydrogen bonding occurring between the respective layers.

To form the membranes 10 according to the teachings of the present invention, a number of different processes can be used, including but not limited to, coextrusion blow molding utilizing continuous extrusion, intermittent extrusion utilizing (1) reciprocating screw systems, (2) ram accumulator-type systems; or (3) accumulator head systems, coinjection stretch blow molding, or co-extruded sheet, blown film, tubing or profiles. It has been found that multi-layer processes such as tubing, sheet and film extrusion, blow molding utilizing co-extrusions give rise to products which appear to demonstrate the desired significant hydrogen bonding between the respective layers of thermoplastic urethane and the copolymers of ethylene and vinyl alcohol. For example, to form a product such as a hydraulic accumulator bladder or diaphragm via a multi-layer process, such as blow molding a product in accordance with the teachings of the present invention would typically be processed as follows utilizing any one of a number of commercially available blow molding machines such as a Bekum BM502 utilizing a co-extrusion head model no. BKB95-3B1 (not shown) or a Krup KEB-5 utilizing a model no. VW60/35 co-extrusion head (not shown).

Initially, the resinous materials (namely the thermoplastic urethanes and the barrier material such as copolymers of ethylene and vinyl alcohol) are first dried to the manufacturer's specification (if necessary) and fed into the extruder. Typically, the materials are fed into the extruders according to the order in which the layers are to be arranged, for example TPU in an outside extruder, EVOH in a middle extruder and TPU in inside extruder. The extruder heat profile is set for the best processing of the individual materials. However, it is suggested that no more than 20° F. difference be present at the exit point of each extruder. As the material is forced forward in each extruder the heat profile is set to achieve the best molten mass. The heat profile would typically be set for between 300° F. to about 450° F. with the feed zone being the lowest set point and all other set points gradually increasing in increments of approximately 10° F. until the desired melt is achieved. Once leaving the extruders a section of pipes is sometimes used to direct the material to the multi-layered head (i.e. three or more heads). It is at this point that any adjustments for differences in heat be addressed. The pumping action of the extruders not only forces the material into the individual head channels or flow paths but also determines the thickness of each layer. As an example, if the first extruder has a 60 mm diameter, the second has an extruder 35 mm diameter and the third extruder has a 35 mm diameter, the speed required to produce a 1.3 liter bladder or diaphragm requiring 2 mm for the outside layer of TPU, 3 mills for the EVOH layer and 2 mm for the inside layer of TPU produced under a desired cycle time of 26 seconds, then the first extruder would have a screw speed of about 10 rpm's, the second extruder would have a screw speed of about 5 rpm's and the third extruder would have a screw speed of about 30 rpm. Once entering the head channels or flow paths, the heat would normally be held constant or be decreased to adjust for the melt strength of the materials. The individual head channels or flow paths keep separate the molten masses while directing them downward and into the shape of a parison.

Just prior to entering the lower die or bushing and the lower mandrel, the material head channels or flow paths are brought together under the pressure created by the now unitary flow path surface area, the gap between the lower bushing and mandril and the pressure on the individual layers from the respective extruders. This pressure must be at least 200 psi and is normally, under the conditions described, in excess of 800 psi. At the point where the materials come together one parison is now formed that is a laminate made up of the three layers of thermoplastic urethane, copolymer of ethylene and vinyl alcohol and thermoplastic urethane, respectively, and is chemically bonded together as described herein. The upper limit of the pressure is essentially only constrained by the physical strength of the head. After exiting the head, the laminate is closed on each end by the two mold halves and a gas such as air is injected into the mold forcing the laminated parison to blow up against the mold and be held in this fashion until sufficient cooling has taken place (i.e. approximately 16 seconds for the aforementioned sample), at which point the gas is exhausted. The part is then removed from the mold and further cooling is allowed for sufficient time to allow for the part to be de-flashed or further processed as some parts may require. As should now be understood by those skilled in the art, the layers must be held separate until fully melted and preformed into a hollow tube at which time they are chemically bonded as described under the heat and pressure described herein.

As those skilled in the plastic forming industry will recognize, the three major components of a blow molding machine, namely the extruders, die heads and mold clamps, come in a number of different sizes and arrangements to accommodate the consumer production rate schedule and size requirements.

A multi-layer process known as sheet co-extrusion involves an extrusion technique for the simultaneous extrusion of two or more polymers through a single die where the polymers are joined together such that they form distinct, well bonded layers forming a single extruded product. Typical layer structures are defined as follows:

A-B
   Two distinct layers consisting of two resins.

A-B-A
   Three distinct layers consisting of two or three resins.

A-B-A-B-A
   Five distinct layers consisting of two, three, four or five resins.

A-B-A
   When making a three layer sheet co-extrusion A-B-A consisting of two resins. (A-layer=TPU, B-layer=EVOH).

Figure 11:
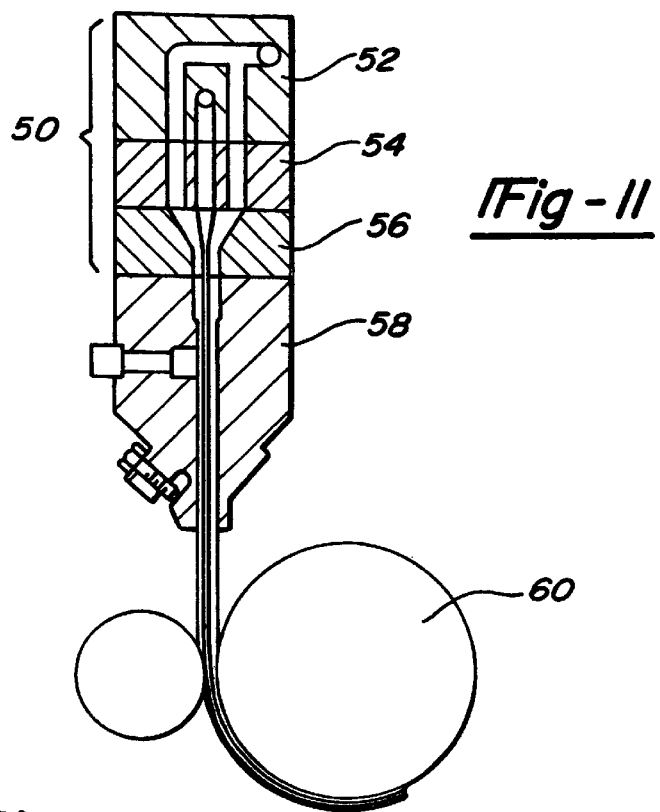
FIG. 11 is a side elevation view of a sheet co-extrusion assembly.
Figure 12:
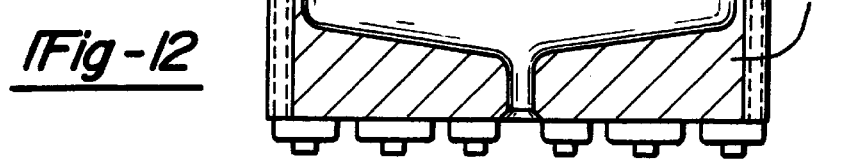
FIG. 12 is a cross-sectional view of the manifold portion of the sheet co-extrusion assembly of FIG. 12.

The equipment required to produce co-extruded sheet consists of one extruder for each type of resin which are connected to a co-extrusion feed block such as that shown in FIGS. 11 and 12, which are commercially available from a number of different sources including the Cloreon Company of Orange, Tex. and Production Components, Inc. of Eau Claire, Wis., among others. The co-extrusion feed block 50 consists of three sections. The first section 52 is the feed port section which connects to the individual extruders and ports the individual round streams of resin to the programming section 54. The programming section 54 then reforms each stream of resin into a rectangular shape the size of which is in proportion to the individual desired layer thickness. The transition section 56 combines the separate individual rectangular layers into one square port. The melt temperature of the TPU A layers should be between about 360° F. to about 465° F. To optimize adhesion between the TPU A layers and EVOH B layer, the actual temperature of each melt stream should be set such that the viscosities of each melt stream closely match. The combined laminar melt streams are then formed into a single rectangular extruded melt in the sheet die 58 which preferably has a "coat hanger" design as shown in FIG. 12 which is now commonly used in the plastics forming industry. Thereafter the extrudate can be cooled utilizing rollers 60 forming a rigid sheet by either the casting or calendaring process.

Figure 13:
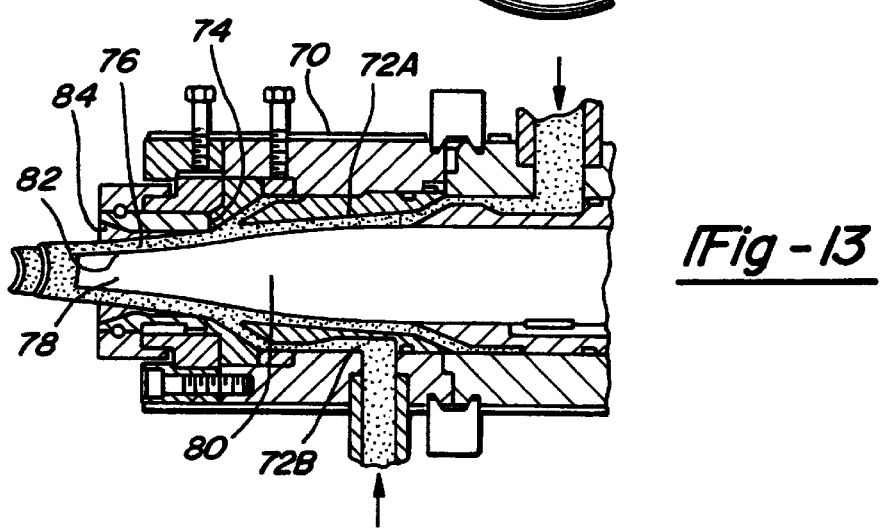
FIG. 13 is a side elevation view of a tubing co-extrusion assembly.

The equipment required to produce co-extruded tubing consists of one extruder for each type of resin. Each extruder is connected to a common multi-manifolded tubing die. The polymer melt from each extruder enters a die manifold such as the one illustrated in FIG. 13 which is commercially available from a number of different sources including Canterberry Engineering, Inc. of Atlanta, Ga. and Genca Corporation of Clearwater, Fla. and flows in separate circular flow channels 72A and 72B for the thermoplastic urethane and the copolymer of ethylene and vinyl alcohol, respectively. The flow channels are then shaped into a circular annulus the size of which is proportional to the desired thickness for each layer. The individual melts are then combined to form one common melt stream just prior to the die entrance 74. The melt then flows through a channel 76 formed by the annulus between the outer surface 78 of a cylindrical mandrel 80 and the inner surface 82 of a cylindrical die shell 84. The tubular shaped extrudate exits the die shell and then can be cooled into the shape of a tube by many conventional pipe or tubing calibration methods. While a two component tube has been shown in FIG. 13 it should be understood by those skilled in the art that additional layers can be added through separate flow channels.

Regardless of the plastic forming process used, it is of paramount importance that a consistent melt of the resinous thermoplastic urethane and ethylene vinyl alcohol are obtained to accomplish the desired extensive hydrogen bonding therebetween across the intended length or segment of the laminated product. Thus, the multi-layer processes utilized should be carried out at maintained temperatures of from about 300° F. to about 450° F. for the thermoplastic urethanes and the ethylene vinyl alcohol copolymer. Furthermore, it is important to maintain sufficient pressure of at least 200 psi at the point where hydrogen bonding occurs for a sufficient amount of the hydrogen bonding to be maintained.

THEORETICAL BONDING REACTION

Referring particularly to FIGS. 1–4, the theoretical chemical reaction, which forms a surface bond during the reactive contact between the various alternating layers of the present invention including thermoplastic urethane and the copolymer of ethylene and vinyl alcohol and occurs across substantially the entire intended contact surface area of the membranes 10, can be summarized as follows:

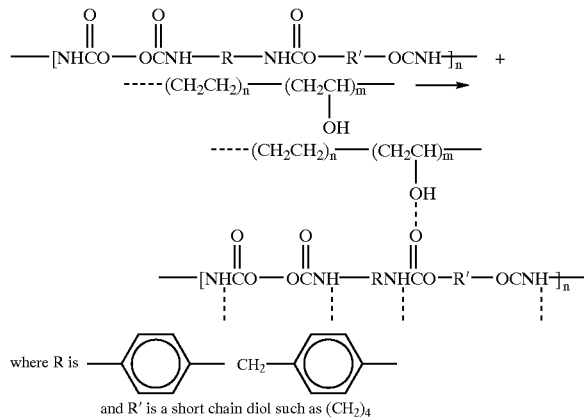

Tests were conducted on materials used to form the laminated membranes 10 of the present invention and on samples of the membranes to characterize the theoretical reaction. Initially, a sample of a commercially available form of thermoplastic urethane (namely Pellethane™) was placed in a solution of ethylene diamine to determine whether any free isocyanate groups were present. No precipitation occurred; thus, no urea was formed. It was accordingly theorized that no available isocyanate groups were present to potentially bond with the hydroxyl groups offered by the vinyl alcohol constituent of the copolymer of ethylene and vinyl alcohol. Thus, no conventional isocyanate/polyol reaction is taking place as described in U.S. Pat. No. 5,036,110.

Thereafter, samples in the form of thin films were prepared for use in characterizing the possible surface reaction between oxygen molecules contained on the thermoplastic urethane and hydroxyl groups offered by the vinyl alcohol constituent of the copolymer of ethylene and vinyl alcohol. Relatively thin films were prepared of Elastollan® C-90A-13(000) polyester based thermoplastic urethane, Pellethane™ 2355-87AE polyester based thermoplastic urethane and SOARNOL™ ethylene vinyl alcohol copolymer. Additionally, a thin film was formed from a three layer laminate including a first layer of Pellethane™ 2355-80AE or 2355-80AE, a second layer of EVAL™ and a third layer of Pellethane™ 2355-80AE. According to the Fourier Transform Infrared Radiation Spectrum shown in FIGS. 7 through 10, a significant presence of hydrogen bonding was detected in each film at approximately the 3400 wave number, $cm^{-1}$. Thus, the strong bond observed in the membranes of the present invention (without cross-linking or the use of a tie-layer or adhesive) appears to be generated by hydrogen bonding which is observed to occur over substantial lengths of the membranes of the present invention. Accordingly, membranes of the present invention employing alternating layers of thermoplastic urethane and copolymers of ethylene vinyl alcohol will resist delamination (except when disposed in highly polar solvents) without requiring adhesive or tie-layers.

In addition to the theoretical hydrogen bonding which occurs, other factors such as orientation forces and induction forces, otherwise known as van der Waals forces, which result from London forces which exist between any two molecules and dipole-dipole forces which are present between polar molecules, also contribute to the bond strength between contiguous layers of thermoplastic material and the main barrier material.

The hydrogen bonding between layers of thermoplastic urethane and the ethylene- vinyl alcohol copolymer of the present invention is in contrast to prior art embodiments which, failing to recognize the existence and/or potential of such bonding, typically have used adhesive tie-layers such as Bynel, for example, to improve and maintain, the bonding between the various layers of thermoplastic urethane and ethylene vinyl alcohol. The arts' failure to recognize the existence and/or potential of such bonding is further illustrated in U.S. Pat. No. 5,036,110. The patent discloses a pre-mixing of the a copolymer of ethylene and vinyl alcohol with thermoplastic polyurethane in order to provide a barrier layer which is sandwiched between layers of thermoplastic polyurethane. This is believed to be significantly different than unmixed layers of thermoplastic urethane and copolymer of ethylene and vinyl alcohol. The patentee of U.S. Pat. No. 5,036,110 further suggests that the premixed layer of thermoplastic urethane and ethylene and vinyl alcohol copolymer must be further modified in order to be securely bound to the two TPU layers.

It should be recognized that the numerous possible products which can be formed from the membranes 10 disclosed herein are virtually only limited by processing considerations. Further, the average thicknesses of any layers of thermoplastic urethane and ethylene vinyl alcohol copolymer is essentially a fraction of the intended use of the final product. In this regard, it should also be recognized by those skilled in the art that different forms of thermoplastic urethanes and copolymers of ethylene and vinyl alcohol can be employed within the same multi-layer laminated membrane, provided the forms used give rise to the above described hydrogen bonding. Likewise, the durometer hardness of the materials can be altered to accommodate customer needs.

While the above detailed description describes the preferred embodiment of the present invention, it should be understood that the present invention is susceptible to modification, variation and alteration without deviating from the scope and fair meaning of the subjoined claims.

What is claimed:

1. A sealed bladder inflated with a media in the form of either a gas or liquid, comprising:
    a laminated membrane comprising
        a first layer including a thermoplastic urethane that provides elasticity to said laminated membrane; and
        a second layer including at least one copolymer of ethylene and vinyl alcohol, said second layer providing selective imperviousness from gaseous fluids to said laminated membrane;
        wherein contact between said first and second layers occurs upon laminating said first and second layers together at a temperature of between about 300° to about 465° F. and consists essentially of hydrogen bonding.

2. The bladder according to claim 1 wherein said second layer has an average thickness of between about 10–500 microns.

3. The bladder according to claim 1 wherein said laminated membrane further comprises a third layer of material including thermoplastic urethane, wherein the thermoplastic urethane of said third layer is in contact in the form of hydrogen bonding with at least one copolymer of ethylene and vinyl alcohol of second layer on the side opposite said first layer.

4. The bladder according to claim 3 wherein said laminated membrane further comprises a fourth layer including a copolymer of ethylene and vinyl alcohol which is in contact with either said first or third layers and a fifth layer including thermoplastic urethane which is in contact with said fourth layer.

5. The bladder according to claim 1 wherein said thermoplastic urethane includes at least one constituent selected from the group consisting of polyester, polyethers, polycaprolactone, polyoxypropylene, polycarbonate macrogels and mixtures thereof.

6. The bladder according to claim 1 wherein said at least one copolymer of ethylene and vinyl alcohol has an ethylene content of between about 27 mol. % to about 48 mol. %.

7. The bladder according to claim 1 wherein said second layer consists essentially of at least one copolymer of ethylene and vinyl alcohol.

8. A sealed bladder inflated with a media in the form of either a gas or liquid, comprising:
    a laminated membrane comprising
        first and third layers including a thermoplastic urethane; and
        a second layer disposed between said first and third layers and formed from a material including a copolymer of ethylene and vinyl alcohol, said second layer having an average thickness of between about 10 microns to about 500 microns;
        whereby said thermoplastic urethane of said first and third layers is in contact with one or more copolymers of ethylene and vinyl alcohol of said second layer, wherein said contact occurs upon laminating said layers together at a temperature of between about 300° to about 465° F. and consists essentially of hydrogen bonding.

9. The bladder according to claim 8 wherein said laminated membrane further comprises a fourth layer including a copolymer of ethylene and vinyl alcohol which is in contact with either said first or third layers and a fifth layer including thermoplastic urethane which is in contact with said fourth layer.

10. The bladder according to claim 8 wherein said thermoplastic urethane includes at least one constituent selected from the group consisting of polyester, polyether, polycaprolactone, polyoxypropylene, polycarbonate macrogels and mixtures thereof.

11. The bladder according to claim 8 wherein said at least one copolymer of ethylene and vinyl alcohol has an ethylene content of between about 27 mol. % to about 48 mol. %.

12. The bladder according to claim 8 wherein said second layer consists essentially of at least one copolymer of ethylene and vinyl alcohol.

13. A sealed bladder inflated with a media in the form of either a gas or liquid, comprising:
    a laminated membrane being formed by extruding a first layer including a thermoplastic urethane that provides elasticity to said laminated membrane; together with a second layer including at least one copolymer of ethylene and vinyl alcohol at a temperature of about 300 to about 465° F., said second layer providing selective resistance to gas permeation to said laminated membrane, wherein contact between said thermoplastic urethane of said first layer and said at least one copolymer of ethylene and vinyl alcohol of said second layer consists essentially of hydrogen bonding.

14. The bladder according to claim 13 wherein said second layer has an average thickness of between about 10–500 microns.

15. The bladder according to claim 13 wherein said laminated membrane further comprises a third layer of material including thermoplastic urethane, wherein said thermoplastic urethane of said third layer is in contact in the form of hydrogen bonding with the at least one copolymer of ethylene and vinyl alcohol of said second layer on the side opposite said first layer.

16. The bladder according to claim 15 wherein said laminated membrane further comprises a fourth layer including a copolymer of ethylene and vinyl alcohol which is in contact with either said first or third layers and a fifth layer including thermoplastic urethane which is in contact with said fourth layer.

17. The bladder according to claim 13 wherein said thermoplastic urethane includes at least one constituent selected from the group consisting of polyester, polyether, polycaprolactone, polyoxypropylene, polycarbonate macrogels and mixtures thereof.

18. The bladder according to claim 13 wherein said at least one copolymer of ethylene and vinyl alcohol has an ethylene content of between about 27 mol. % to about 48 mol. %.

19. A sealed bladder inflated with a media in the form of either a gas or liquid, comprising:
    a laminated membrane comprising
        a first layer including a thermoplastic urethane that provides elasticity to said laminated membrane; and
        a second layer including a barrier material selected from the group consisting of copolymers of ethylene and vinyl alcohol, aliphatic and aromatic polyamides, polyvinylidene chloride, copolymers of acrylonitrile and methyl acrylate, polyesters, liquid crystal polymers, polyurethane based thermoplastics and mixtures thereof;
        whereby said first and second layers are brought into contact at a temperature of about 300° to about 465° F., wherein said contact consists essentially of hydrogen bonding occurring between said thermoplastic urethane of said first layer and at least one of said barrier materials.

20. The bladder according to claim 19 wherein said second layer has an average thickness of between about 10–500 microns.

21. The bladder according to claim 19 wherein said laminated membrane further comprises a third layer of material including thermoplastic urethane, wherein the thermoplastic urethane of said third layer is in contact in the form of hydrogen bonding with at least one of said barrier materials of second layer on the side opposite said first layer.

22. The bladder according to claim 21 wherein said laminated membrane further comprises a fourth layer including a barrier material selected from the group consisting of copolymers of ethylene and vinyl alcohol, aliphatic and aromatic polyamides, polyvinylidene chloride, copolymers of acrylonitrile and methyl acrylate, polyesters, liquid crystal polymers, polyurethane based thermoplastics and mixtures thereof which is in contact with either said first or third layers and a fifth layer including thermoplastic urethane which is in contact with said fourth layer.

23. The bladder according to claim 19 wherein said thermoplastic urethane includes at least one constituent selected from the group consisting of polyester, polyether, polycaprolactone, polyoxypropylene, polycarbonate macrogels and mixtures thereof.

24. The bladder according to claim 15 wherein said at least one copolymer of ethylene and vinyl alcohol has an ethylene content of between about 27 mol. % to about 48 mol. %.

25. A sealed bladder inflated with a media in the form of either a gas or liquid, comprising:
   a laminated membrane comprising
   a first layer including a thermoplastic urethane that provides elasticity to said laminated membrane; and
   a second layer including a blended barrier material employing at least one copolymer of ethylene and vinyl alcohol and at least one other constituent selected from the group consisting of aliphatic and aromatic polyamides, polyvinylidene chloride, copolymers of acrylonitrile and methyl acrylate, polyesters, liquid crystal polymers, polyurethane based thermoplastics and mixtures thereof;
   whereby said first and second layers are brought into contact consisting essentially of hydrogen bonding occurring between said thermoplastic urethane of said first layer and said at least one copolymer of ethylene and vinyl alcohol of said second layer at a temperature of about 300° to about 465° F., said laminated membrane having a gas transmission rate of 10.0 or less for nitrogen based on an average thickness of 20 mils.

26. The bladder according to claim 25 wherein said second layer has an average thickness of between about 10–500 microns.

27. The bladder according to claim 25 wherein said laminated membrane further comprises a third layer of material including thermoplastic urethane, wherein the thermoplastic urethane of said third layer is in contact in the form of hydrogen bonding with at least one copolymer of ethylene and vinyl alcohol of second layer on the side opposite said first layer.

28. The bladder according to claim 27 wherein said laminated membrane further comprises a fourth layer including a copolymer of ethylene and vinyl alcohol which is in contact with either said first or third layers and a fifth layer including thermoplastic urethane which is in contact with said fourth layer.

29. The bladder according to claim 25 wherein said thermoplastic urethane includes at least one constituent selected from the group consisting of polyester, polyether, polycaprolactone, polyoxypropylene, polycarbonate macrogels and mixtures thereof.

30. The bladder according to claim 25 wherein said at least one copolymer of ethylene and vinyl alcohol has an ethylene content of between about 27 mol. % to about 48 mol. %.

* * * * *

UNITED STATES PATENT AND TRADEMARK OFFICE
CERTIFICATE OF CORRECTION

| | | |
|---|---|---|
| PATENT NO. | : 6,620,472 B1 | Page 1 of 1 |
| APPLICATION NO. | : 08/684351 | |
| DATED | : September 16, 2003 | |
| INVENTOR(S) | : Erwin C. Shepard et al. | |

It is certified that error appears in the above-identified patent and that said Letters Patent is hereby corrected as shown below:

Column 2,
Line 29, "450°" should be --465°--.

Column 4,
Line 25, "48 mol" should be --48 mol %--.
Line 35, "others" should be --other thermoplastic urethanes--.
Line 36, after "those" insert --based on compositions--.
Line 38, delete "macrogel".
Line 38, after "thereof" insert --, for example--.
Line 44, "SOARNOLT" should be --SOARNOL--.
Line 55, after "accumulators." insert --Ideally, as indicated in copending United States Patent Application Serial No. 08/299,286 which is expressly incorporated herein by reference, the laminated membranes of the present invention will typically have a gas transmission rate of 10.0 or less for nitrogen based on a 20.0 mil thickness.--.

Column 6,
Line 30, "6" should be --26--.
Line 49, after "extrusion," insert --or--.

Column 7,
Line 13, "450°" should be --465°--.

Column 9,
Line 12, "450°" should be --465°--.

Signed and Sealed this
Third Day of April, 2012

David J. Kappos
*Director of the United States Patent and Trademark Office*